Nov. 30, 1943. J. F. MEDUNA Re. 22,398

SPRAY METAL COATED, METAL SURFACED ARTICLE

Original Filed Aug. 6, 1942

INVENTOR.
John Frank Meduna
BY
Louis Burgess
Att'y

Reissued Nov. 30, 1943

Re. 22,398

UNITED STATES PATENT OFFICE 22,398

SPRAY METAL COATED, METAL SURFACED ARTICLE

John Frank Meduna, Seattle, Wash., assignor to Metallizing Engineering Co., Inc., Long Island City, N. Y., a corporation of New Jersey Original No. 2,320,329, dated May 25, 1943, Serial No. 453,905, August 6, 1942. Application for reissue August 14, 1943, Serial No. 498,609

8 Claims. (Cl. 117—50)

This invention relates to new and useful improvements in spray metal coated, metal-surfaced articles.

In industrial practice, a coating of metal is frequently applied to a base of the same or other metal by spraying. For this purpose, the metal to be applied is projected against the surface to be covered in the form of a spray, the particles of which are in a molten or heat plastic condition. As a rule, metal spraying is carried out with the use of metal spray guns, i. e., devices in which the metal is fed to a heating zone from which zone metal particles, at least some of which are molten or in a heat plastic condition, are propelled against the surface to be sprayed, by a blast of air or other gas. The application of sprayed metal may, for example, be carried out to protect the base against corrosion, to provide a surface of the desired ornamental or bearing characteristics, or to build up worn machine parts.

In making spray metal coated articles, particularly re-built bearings or other working surfaces of machine parts, it is essential that the applied spray metal adheres to the surface to which it is applied with a high degree of bond, for, otherwise the applied spray metal will come off. In the past, spray metal coated, metal-surfaced articles have been generally of two kinds. Those in which the base is pre-conditioned for spray metal bonding by mechanical roughening and those in which the base is so pre-conditioned by heating.

Mechanical roughening of a metal surface to adapt the same to receive and retain applied spray metal must be of a type involving the formation of a multiple number of closely spaced cavities with peened and splayed edges and interspaces, forming a multitude of keyways. Hitherto, the most common method of procuring such type surface has been by sand or grit blasting. Sand or grit blasting, however, is in many cases unsatisfactory and spray metal coated articles, obtained from such sand or grit blasted surfaces will often come part by reason of the deficient bond obtaining between the spray metal coating and the blasted surface. This is particularly true when heavier spray metal coatings have been applied to substantially flat surfaces and in cases where spray metal has been applied to surfaces forming an inside diameter. Spray metal has a tendency to shrink and in these cases the sand or grit blasted surface does not provide a sufficient bonding surface to prevent the separation of the applied spray metal coating from the base. For this reason, for instance, it has never been practical to make spray metal coated, hardened engine valve seats or similar objects in which an especially strong bond between the spray metal coating and the base is required. Furthermore, many bases and particularly those constituted by machine tools or parts such as, for instance, generator shafts or the like, are inherently unsuitable for sand or grit blasting.

An alternative form of mechanical surface roughening for spray metal bonding purposes is that of machine roughening the surface to be sprayed in a particular manner designed to procure the above-mentioned surface characteristics essential for spray metal bonding. The articles obtained by this roughening method, however, are subject to substantially the same inherent limitations and drawbacks as those prepared from a sand or grit blasted base.

The heating method of surface conditioning a metallic base to bond thereto applied spray metal involves the heating of the surface to a relatively high temperature and to spray the hot surface with metal. This method is not widely used and requires, as a general rule, considerable skill and elaborate equipment and is relatively expensive. Furthermore, in most cases the temperature to which the surface or base must be heated is so high that it tends to warp or otherwise destroy the article to which the metal spray is to be applied. Hence, it is in many cases impossible to obtain satisfactory spray metal coated articles having the spray metal directly heat bonded to its base.

There is one basic limitation inherent in practically all of the hitherto used spray metal bonding means. This limitation resides in the fact that those bonding means are not adaptable to hardened metal articles or surfaces. Many hardened articles or surfaces cannot be properly surface-conditioned by mechanical roughening procedures such as grit or sand blasting or rough-machining. On the other hand, the heating method is not feasible, for most such metal articles or surfaces will soften and thus lose their hardness if they are heated to the temperature necessary to secure the desired degree of bonding to the spray metal applied thereto. Though partly hardened articles have been prepared by grit or sand blasting, using very hard grit such as aluminum oxide abrasives, nevertheless, the bond obtained is usually unsatisfactory.

One object of the invention comprises inter alia a spray metal coated, metal-surfaced article substantially free from the limitations and drawbacks characterizing hitherto known spray metal coated, metal-surfaced articles. This and further objects of the invention will be apparent from the following description.

The spray metal coated, metal-surfaced article in accordance with the invention essentially comprises an article having a metal surface, a layer of spray metal, and, intermediate said metal surface and said layer of spray metal, metal deposited upon and bonded to said surface by fusion and characterized by an irregular surface frozen from semi-liquid state with a multitude of projections with overhanging edges and minute craters with overhanging edges, at least the majority of said projections and craters being in interlock with spray metal particles of said layer of spray metal.

I have found that best results and a particularly good interlock with the superimposed spray metal are obtained by so selecting the size and spacing of the projections and craters on the surface of the fusion-deposited metal that the same are of substantially the same order of magnitude as the size of spray metal particles in the spray metal layer.

Within the preferred embodiment of the invention the irregular surface of fusion-deposited metal is preferably so constituted as to have in addition to the projections of the order of magnitude of spray metal particles, projections of a higher order of magnitude and preferably of an order of magnitude not appreciably in excess of 1/16". These projections of higher order of magnitude, though not necessarily acting as interlocks with spray metal particles of the superimposed layer of spray metal, nevertheless, contribute to the bond by counteracting or preventing slippage of the spray metal layer with respect to the base surface, resulting from the shrinkage of the applied spray metal.

One method, inter alia, of preparing a spray metal coated article in accordance with the invention may be for instance by the deposition of electrode material upon the metal surface of such article and the subsequent application of spray metal to the thusly treated base. The procedure of depositing electrode material broadly involves establishing contact between such metal surface and a metal electrode, electrically heating the contacting surfaces of the electrode and the metal surface by means of an electric current flowing through said contacting surfaces under conditions of resistance heating to substantially fuse electrode material and firmly bond the same to said metal surface and causing small amounts of electrode material to be left deposited on the metal surface. By such fusion-deposition of electrode metal the latter is bonded by fusion to the base leaving a surface of the desired irregular projection and crater pattern without the necessity of further treatment. When making at least some of the metal deposits relatively large, aided if necessary by increases in amperage, the resulting irregular patterned surface will include the larger type projections above referred to.

The electrode material that may be used is preferably of the wire type, i. e., of the type in which a wire or bar, whether "round," "flat" or of any other shape, constitutes an electrode. For best results, a nickel wire electrode is preferred. A 1/8" commercial nickel wire constitutes a satisfactory wire electrode. It is understood that electrode size and electric current should be suitably coordinated.

Contact between the metal electrode and the metal surface to be conditioned for the metal spraying operation is established in the ordinary manner by placing the electrode in direct contact with such surface. Within the range of normal requirements, practically any metal surface and any metal electrode may be used. In case, however, any particular electrode metal should prove unsuitable or unsatisfactory in its application to a given metal surface of a base to be conditioned for spraying, the operator can determine by a few simple empirical tests as to which electrode metal to select. As a practical guide any two metals that can be joined by heating will operate as electrode material on the surface to be conditioned for spraying.

The electric heating of the contacting surfaces of the metal electrode and metal surface to be conditioned for spraying may be effected by placing the electrode and the metal surface in electric circuit with a source of electrical energy in such manner that the circuit is closed by contact between the metal surface and the metal electrode. The conditions of current flow in the circuit upon so closing the same are preferably so adjusted that conditions of resistance heating at the contacting surfaces of electrode and metal surface maintain. By conditions of resistance heating I mean that the current flowing through the contacting surfaces is in amount and intensity sufficient to cause heating at the contacting surfaces by the resistance offered the free flow of the current by reason of the joint constituted by the contacting surfaces.

Though voltages having a wide range, including relatively high voltages of the order of magnitude of one hundred or two hundred volts or more, may be used, I prefer to use voltages of a lower order of magnitude. One of the reasons for the preference for a lower voltage range is that higher voltages have a tendency to arc badly particularly when making and breaking contact between the electrode and the metal surface, whether the making and breaking be deliberately induced or caused by the unevenness of the surface treated. Though relatively mild arcing may be beneficial in the procurement of a satisfactorily conditioned surface, excessive arcing is under normal conditions an undesirable aspect, impairing satisfactory deposit of electrode material. Considerable amounts of metal may be lost as the result of the high temperatures caused by the arc thereby tending to render the procedure less efficient. Furthermore, such arcing is attended by operational difficulties which would often require a greater skill on the part of the operator and or suitable control mechanism. A still further disadvantage of excessive arcing is the formation of metal oxide which may tend to impair the bond in certain cases between the conditioned surface and thereto applied spray metal. It is best, therefore, to so adjust the conditions of current flow in the circuit that, upon closing or breaking the same, the current intensity is sufficiently low to avoid excessive arcing and yet have the current in amount and intensity sufficient to cause the desired deposition and bonding of electrode material.

While very low voltages such as even fractions of one volt can be used and give, when applied with care, fairly satisfactory results, such low voltages are as a rule not desirable for large-scale efficient operations as they require the use of relatively small or at least fairly sharp pointed electrodes so that the procedure is slow. In general, a satisfactory current will depend upon the voltage, the size of the electrodes and principally upon the amount of contact between the electrode and the metal surface of the base to be sprayed. These factors may be adjusted to suit particular conditions. Average voltages from one-half to twenty volts give satisfactory results. For best results, however, a voltage range of from two to nine volts is ordinarily to be preferred. The amount of current to be used may vary over a wide range depending upon the factors hereinabove recited. As a general rule, when using wire electrodes a current in excess of two hundred amperes and most preferably a current of the order of magnitude of about 300 to 400 amperes is satisfactory. Thus, for instance, a 300 ampere current gives good results with a ⅛" nickel wire electrode. When using larger electrodes the use of larger amounts of current may be necessary.

The deposition of small amounts of electrode material may be caused either by the melting off of small amounts of electrode material from the tip of the electrode or by pulling off small amounts of fused surface bonded electrode material from the tip of the electrode when moving the latter. In the majority of cases, deposition of electrode material may be caused in both of these manners. Moving of the electrode will as a rule, accomplish the desired deposition of small amounts of electrode material firmly bonded to the surface area to which electrode contact was applied.

The metal surface to be conditioned for spray metal application when inserted in circuit, as above set forth, with a suitable metal electrode and a suitable source of electric energy is preferably repetitiously contacted such as repetitiously contact stroked with the electrode on successive areas, the stroking action depositing on these areas small amounts of electrode material firmly bonded thereto. Alternatively, the electrode may be applied with a stippling action to the metal surface. While these procedures essentially involve breaking and making contact between the metal surface and the electrode, it is also possible and sometimes advisable to move the electrode relative the base while maintaining resistance-heating contact therebetween. When proceeding in this manner, electrode material is deposited in ridges along the path of movement of the electrode relative the metal base. On the other hand, in the making and breaking contact method small amounts of individual electrode material are deposited upon the metal base. The procedure is continued or repeated in either case until the surface to be sprayed is satisfactorily covered with electrode material. Care should be taken that the electrode is not left in a contact position too long at any one point or area as this may cause the permanent attachment of the electrode to the base and thus render its further movement and further deposit of electrode material impossible.

It is not necessary to have every spot on the metal base covered by the fusion-deposited metal; on the contrary it is sufficient to deposit a large number of small, closely spaced, amounts of metal with spaces in between some of them. The size of the spaces between deposited amounts of metal may be varied over a reasonably wide range at the judgment of the operator. Broadly stated, the smaller the spaces the stronger a bond will result and therefore where a strong bond is not desired the deposits may be quite widely spaced. For a strong bond, however, it is preferred to have spaces between amounts of fusion-deposited metal not appreciably in excess of $\frac{1}{32}$".

The amount of metal, fusion-deposited on the base, as well as the size of the larger type irregular projections, if such are present, may be varied to suit conditions or requirements. When a heavy spray metal coating is to be deposited, it is advisable to make some of the larger type projections relatively large. Some of these projections may thus, for instance, extend as much as $\frac{1}{16}$" or even more. However, where a thin coating such as a $\frac{1}{32}$" coating is to be applied by metal spraying, the height of these larger type projections is preferably kept at less than the thickness of the spray metal coating to be applied, i. e., less than $\frac{1}{32}$", as otherwise, if the spray metal coating is machined smooth, these projections will extend through the coating to the machined surface. There are, however, some applications where this is no disadvantage.

It is sometimes advantageous to make the larger type projections relatively so high that they will extend to beyond the thickness of the coating of sprayed metal that is to be applied, and then, machine off or tool off their tops, so that they will not project through the spray metal coating to be applied. Thereafter, the spray metal coat may be applied.

If desired, small amounts of metal may be fusion-deposited, as described previously, to the base and then the deposition continued so that more metal is so deposited on top of metal previously deposited, as well as in the spaces between previously fusion-deposited metal, a relatively thick metal may be applied. Within normal requirements, the thickness of the coating of intermediate-layer metal has, in itself, as a rule, no effect upon the bond with which the subsequently applied spray metal is held thereto and thus to the base surface of the spray metal coated article in accordance with the invention.

The intermediate layer metal may be deposited upon a suitable metal base, in any one of a number of patterns. For instance, the metal may be deposited, although in small successive amounts, in strips or ridges, or it may be deposited in separate isolated spots, or, for instance, in criss-cross pattern.

The following examples are furnished by way of illustrating procedures for procuring my novel spray metal-coated metal-surfaced articles:

*Example I*

A source of electric energy consisting of a transformer connected to an alternating current power supply is first provided, capable of an average voltage between two and nine volts and approximately 300 amperes. One lead from the source of electric energy is connected to a 2 x 3 x ¼" steel plate, the top surface of which is to receive fusion-deposited metal and has been suitably cleaned such as by application of $CCl_4$ to remove grease and dirt. The other lead from the source of electrical energy is connected to a nickel wire of approximately ⅛" diameter. The nickel wire is first contacted with the top surface of the steel plate and as soon as the metal of the electrode starts to melt the contacted surface is lightly and continuously stroked with the nickel wire over successive areas of the same whereby the end of the nickel wire is caused to make and break contact repetitiously with successive portions of the surface. After the desired surface area has been substantially covered by relatively closely spaced stroke marks of fusion-deposited nickel from the nickel wire electrode, the treatment is discontinued and the surface is then sprayed in the conventional manner with bronze.

*Example II*

A source of electrical energy consisting of a direct current generator is first provided, capable of producing a voltage of 5 volts and approximately 400 amperes. One lead from the source of electric energy is connected to a bronze sleeve, the previously cleaned outside surface of which is to receive fusion-deposited metal; the other lead from the source of electrical energy is connected to a stainless steel strip of flat wire approximately 1/16'' thick by 1/4'' wide. The stainless steel strip is first contacted with the surface of the bronze sleeve, preferably on the edge of the strip, and as soon as the metal of the strip electrode starts to melt the contacted surface is lightly and intermittently stroked with the stainless steel strip over successive areas of the same whereby the end of the stainless steel strip is caused to make and break contact repetitiously with successive portions of the surface. After the desired surface of the sleeve has been substantially covered by a large number of relatively closely spaced amounts of fusion-deposited stainless steel from the strip electrode, the treatment is discontinued and the surface is then sprayed with aluminum.

Thus the article produced in accordance with the foregoing Example I constitutes a composite metal article comprising a steel base, a layer of spray bronze, and intermediate the steel base and the layer of spray bronze, nickel deposited by fusion on the steel base in interlock with the spray bronze by means of the specifically peculiar multitude of minute surface craters and overhanging characteristics of the fusion-deposited metal. The article obtained in accordance with Example II constitutes a similar composite metal article except that in this case the base is of bronze, the fusion-deposited metal, stainless steel and the therewith interlocking spray metal layer, sprayed aluminum.

When in the preparation of the products in accordance with my invention, a base of substantially cylindrical configuration is used, as, for instance, constituted by shafts, sleeves, rods, bars and the like, it is often of advantage to apply the fusion-deposited metal by rotating the object about its axis and proceeding with the hereinabove electrode contact procedure while the object is rotating. In such case, electrode contact if desired may be substantially continuous though it is preferred to use the repetitious contact stroking method above referred to. Rotation of the cylindrical shaped base may be accomplished in any desired manner, it being preferred, however, to rotatably mount the same in a suitable lathe or such similar machine. Surface speed of rotation should not be appreciably in excess of 200 feet per minute, and preferably substantially between 50 and 150 feet per minute. When using surface speed appreciably in excess of 200 feet per minute, considerable voltage drops result by reason of reduced contact; furthermore, the spacing of deposited metal becomes too large and overlaps occur, thereby impairing the efficiency of the procedure.

The following example is furnished by way of illustrating a procedure of preparing a spray metal coated article in accordance with the invention having a metal surfaced base of substantially cylindrical shape and rotating the same in a lathe:

*Example III*

The source of electrical energy, consisting of a transformer, connected to an alternating current power supply, is first provided, capable of an average voltage between two and nine volts and approximately 400 amperes. A one-inch steel shaft of S. A. E. 1045 steel which is to be coated by metal spraying on a section of its length is mounted in a lathe, between lathe centers. One lead from the source of electrical energy is connected to the tailstock of the lathe. The other lead from the source of electrical energy is connected to a nickel wire of approximately 1/8'' diameter. The shaft is rotated in the lathe at a speed of approximately 600 revolutions per minute, and while the shaft is rotating, the nickel wire is first contacted with the surface of the shaft to be conditioned and as soon as the metal electrode starts to melt, the surface of the shaft, while still rotating, is lightly and repetitiously stroked with the nickel wire over successive areas of the same, whereby the end of the nickel wire is caused to make and break contact repetitiously with successive portions of the surface. After the desired surface area has been substantially covered by relatively closely spaced amounts of deposited nickel from the nickel wire electrode, the treatment is discontinued and the surface is now ready to be sprayed upon.

Within the broad scope of my invention, the intermediate metal, i. e., the metal intermediate the metal surface of the base and the spray metal layer, essentially functions as a linking agent and thus, firmly bonds the spray metal to the surface of the base. This function of the intermediate metal is due on the one hand to its fusion-deposition resulting in its firm bonding to the base, and on the other hand is due to the presence of its peculiarly characteristic surface capable of firm interlock with the particles of spray metal and formed by its freezing from semi-liquid state with the multitude of craters and projections of the type and character referred to. The applied spray metal firmly interlocks with at least the majority of these projections and craters.

The type of surface obtained by fusion-deposition of metal on a metal surface and the interlock between the surface of fusion-deposited metal and applied spray metal is demonstrated by the following drawings furnished by way of illustration and not of limitation and representing reproductions of photomicrographs:

Figure 1:
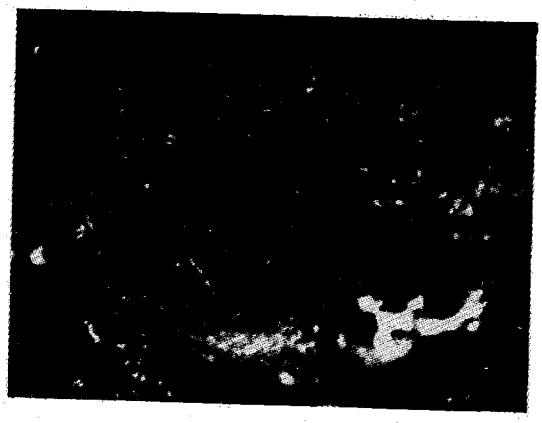
Fig. 1 illustrates a photomicrographic top view of a steel base treated in accordance with the invention.

The deposited metal shown in the photomicrograph represented by Fig. 1 is nickel applied by the electrode contact method on a steel base, using a nickel wire electrode. The view illustrated in the photomicrograph represented by Fig. 1 is a top view, unetched, with an oblique illumination. The magnification is 50X showing the craters and overhanging projections. The blurred structure high-lighted in the foreground of the photomicrograph is one of the larger projections which, being closer to the camera, is somewhat out of focus.

Figure 2:
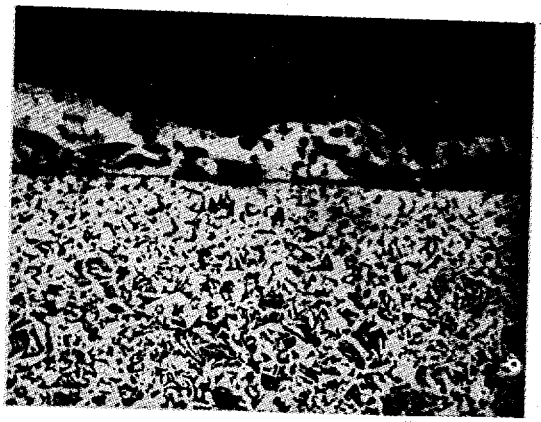
Fig. 2 illustrates a photomicrographic cross-section of the specimen shown in Fig. 1.

The photomicrograph represented by Fig. 2 illustrates a cross-section of the specimen used in the preparation of photomicrograph represented by Fig. 1 showing a view perpendicular to the prepared surface at the edge of the specimen using a conventional picral etch and 100X magnification. The overhanging projections and craters with overhanging edges and projections in the top layer of the electrode deposited metal are clearly shown. In the lower portion of the photomicrograph represented by Fig. 2 is the normal structure of the steel plate serving as a base; combined by fusion to this base is the electrode deposited nickel, having the appearance of solidified or frozen froth, foam or lava showing the projections and the many holes and pores, which at the upper surface of the nickel layer, constitute the craters with overhanging edges with which the thereafter to be applied spray metal can interlock.

Figure 3:
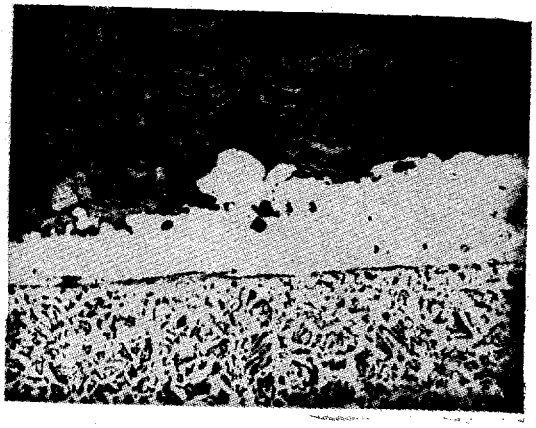
Fig. 3 is a photomicrographic cross-sectional cut through a steel base treated with nickel in accordance with the invention and having a superimposed spray metal coat.

The interlock between the electrode deposited metal and the applied spray metal is typified for instance by the photomicrograph represented by Fig. 3 which shows a cross-sectional cut through a specimen obtained by spraying steel on a sample obtained by depositing nickel on a steel base by the electrode deposition method referred to. The cut was treated in the conventional manner with a picral etch. The photomicrograph represented by Fig. 3 illustrates a 100X magnification. The lower portion of the photomicrograph represented by Fig. 3 shows the normal structure of the mild steel base used. Bonded to this by fusion is the intermediate fusion-deposited nickel layer of a characteristic frozen froth, foam or lava appearance. The top surface is that of the superimposed spray steel. The characteristic craters, projections and overhanging edges of the intermediate fusion-deposited nickel layer are clearly shown in typical interlock with particles of the spray metal layer.

As afore pointed out, any common metal may be used intermediate practically any base and any spray metal. Thus, for instance, silver, Monel, aluminum, brass, stainless steel, inconel or the like, may be used either as fusion-deposited metal or as base upon which the same is deposited. In most cases, however, I prefer for best results, nickel, bronze or silver as the intermediate metals and among these nickel as the most satisfactory material.

When using in the above described procedure, wire electrodes for the deposition by fusion of intermediate metal, it is of advantage to use wires, whether round or flat shaped, having a maximum cross-sectional width substantially between $\frac{1}{16}''$ and $\frac{1}{4}''$. The source of electrical energy may be one providing either an alternating or a direct current.

If the process, herein recited by way of example for the making of my novel spray metal coated articles, is applied using large amounts of current substantially continuously on a small piece of base metal, the base may heat up considerably. This may be controlled, however, by not using too much current on small base pieces or by allowing time to elapse between the application of the amounts of electrode material to the base, and also by applying cooling means, such as a blast of air to cool the surface either during or between application of electrode material.

The products in accordance with my invention include those having a metal surface or base consisting of spray metal. When speaking of a metal surface or metal base, therefore, I mean to include thereby a spray metal surface or base.

The principal linking or bonding characteristics of the intermediate metal with respect to the base surface are induced, as herein above stated, by fusion-deposition. Such fusion-deposition, within the spirit and scope of my invention, does not necessarily connote solely fusion or deposition by fusion to the point of complete fusion of the entire deposited metal, but also embraces deposition of metal only part of which is fused and still further includes the case in which the fusion of part or all of the deposited metal, as is well understood, does not necessarily proceed to the point of free-flowing liquidity.

In the preparation of spray metal coated articles in accordance with this invention, the spray metal coating is applied in any desired conventional manner. Thus the same may be applied by passing a conventional metal spray gun forth and back over the intermediate fusion deposited metal layer until a spray metal coating of the desired thickness is formed.

The foregoing specific description is for purposes of illustration and not of limitation and it is therefore my intention that the invention be limited only by the appended claims or their equivalents wherein I have endeavored to claim broadly all inherent novelty.

I claim:

1. A spray metal coated, metal-surfaced article which comprises an article having a metal surface, a layer of spray metal, and, intermediate said metal surface and said layer of spray metal, fused metal deposited upon and integrally bonded to said surface by fusion to said surface and characterized by an irregular surface frozen from semi-liquid state with a multitude of projections with over-hanging edges and minute craters with over-hanging edges, at least the majority of said projections and craters being in interlock with spray metal particles of said layer of spray metal, and at least the majority of said projections being in size and spacing substantially of the same order of magnitude as the size of spray metal particles in the spray metal layer.

2. A spray metal coated, metal-surfaced article in accordance with claim 1 in which said intermediate metal is nickel.

3. A spray metal coated, metal-surfaced article in accordance with claim 1 in which said intermediate metal is bronze.

4. A spray metal coated, metal-surfaced article in accordance with claim 1 in which said intermediate metal is silver.

5. A spray metal coated, metal-surfaced article which comprises an article having a metal surface, a layer of spray metal, and, intermediate said metal surface and said layer of spray metal, fused metal deposited upon and integrally bonded to said surface by fusion to said surface and characterized by an irregular surface frozen from semi-liquid state with a multiple number of first projections, a multitude of second projections with over-hanging edges and a multitude of minute craters having overhanging edges at least some of said second projections being in size and spacing substantially of the same order of magnitude as the size of spray metal particles in the spray metal layer and at least some of said first projections being of a higher order of magnitude, at least the majority of said second projections and the majority of said craters being in interlock with spray metal particles of said layer of spray metal.

6. A spray metal coated, metal-surfaced article in accordance with claim 5 in which said intermediate metal is nickel.

7. A spray metal coated, metal-surfaced article in accordance with claim 5 in which said intermediate metal is bronze.

8. A spray metal coated, metal-surfaced article in accordance with claim 5 in which said intermediate metal is silver.

JOHN FRANK MEDUNA.